United States Patent
Lan et al.

(10) Patent No.: US 7,352,407 B2
(45) Date of Patent: Apr. 1, 2008

(54) DIGITAL PHOTO FRAME DEVICE

(75) Inventors: Chien-Hung Lan, Tainan (TW);
Yuan-Chih Peng, Taipei (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 550 days.

(21) Appl. No.: 10/972,417

(22) Filed: Oct. 26, 2004

(65) Prior Publication Data
US 2005/0162555 A1    Jul. 28, 2005

(30) Foreign Application Priority Data
Jan. 28, 2004   (TW) .............................. 93101892 A

(51) Int. Cl.
*H04N 5/50* (2006.01)

(52) U.S. Cl. ..................... 348/569; 348/563; 345/634

(58) Field of Classification Search ........ 348/553–570; 345/867, 634, 636, 638, 632; 368/182, 223, 368/239
See application file for complete search history.

(56) References Cited

U.S. PATENT DOCUMENTS 6,363,440 B1*  3/2002  Stepp et al. ................. 710/52
2002/0018115 A1*  2/2002  Sakata ..................... 348/14.08
2002/0113894 A1*  8/2002  Yang et al. ................. 348/564
2004/0075700 A1*  4/2004  Liu et al. ..................... 345/867
2004/0244054 A1*  12/2004  Sheu et al. ................. 725/131

\* cited by examiner

*Primary Examiner*—M. Lee
(74) *Attorney, Agent, or Firm*—Bacon & Thomas, PLLC

(57) ABSTRACT

This invention provides a digital photo frame device, wherein a buffer unit temporarily stores TV signals to be displayed or processed, a compression/decompression engine is coupled to the buffer unit for compressing TV signals into an image file or decompressing an image file into TV signals, a video processor displays the TV signals on a display unit, and an OSD clock display unit records the current time and stores an OSD time pattern in advance. The OSD clock display unit determines a real-time clock pattern to be displayed and the position of the display, according to the recorded current time and the corresponding OSD time pattern selected when the video processor displays a predetermined clock background pattern so that the clock background pattern and the real-time clock pattern overlying over the clock background pattern are displayed on the video display in an OSD fashion.

6 Claims, 3 Drawing Sheets

0 1 2 3 4 5 6 7 8 9 :

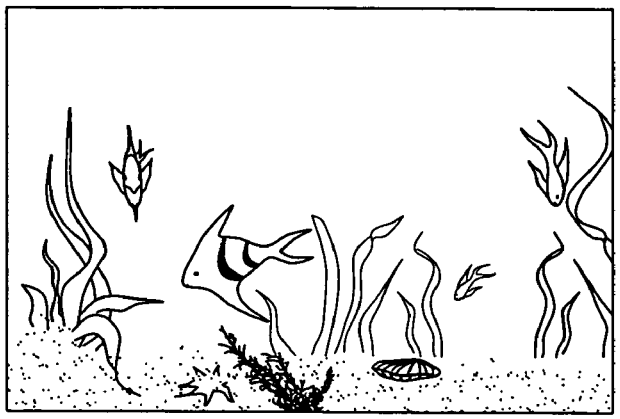
FIG. 3A　　　　　　　FIG. 3B
09:30:21
FIG. 4A　　　　　　　FIG. 4B
FIG. 5A　　　　　　　FIG. 5B

DIGITAL PHOTO FRAME DEVICE

BACKGROUND OF THE INVENTION

1. Field of the Invention

The present invention relates to the filed of digital televisions (TVs), and more particularly to a digital photo frame device adapted to the digital TVs.

2. Description of Related Art

TVs have become the electrical appliances common in the household. As the electronic technologies advanced, a digital TV capable of providing with better quality image and more program channels is already developed. Hence, the traditional TVs will be gradually replaced by the digital TVs.

While the digital TV provides viewers with TV programs, no application of other digital multimedia is presented. As various digital products are introduced, the users demand the co-use of the various digital products. In view of the fact that the digital TVs have better quality image display, it is therefore desired to find way to fully utilize the digital TV advantage of image display so that the users' demand is satisfied.

SUMMARY OF THE INVENTION

The primary object of the present invention is to provide a digital photo frame device so as to have photo-memo and clock-on-TV functions.

In accordance with one aspect of the present invention, there is provided a digital photo frame device comprising a buffer unit for temporarily storing TV signals to be displayed or processed, a compression/decompression engine coupled to the buffer unit for compressing TV signals in the buffer unit into an image file or decompressing an image file into TV signals, a video processor for displaying the TV signals temporarily stored in the buffer unit on a display unit, and an OSD clock display unit for recording the current time and storing at least an OSD time pattern in advance; wherein the OSD clock display unit determines a real-time clock pattern to be displayed and the position of the display according to the recorded current time and the corresponding OSD time pattern selected when the video processor displays a predetermined clock background pattern so that the clock background pattern and the real-time clock pattern overlying over the clock background pattern are displayed on the video display in an OSD fashion.

In accordance with another aspect of the present invention, there is provided a digital photo frame device comprising: a buffer unit for temporarily storing TV signals to be displayed or processed; a compression/decompression engine coupled to the buffer unit for compressing TV signals in the buffer unit into an image file or decompressing an image file into TV signals; an external storage device pre-saved with data representing at least a picture; an interface unit coupled to the buffer unit to write data from the buffer unit to the external storage device or data from the external storage device to the buffer unit; and a video processor for displaying the TV signals temporarily stored in the buffer unit on a display unit.

Other objects, advantages, and novel features of the invention will become more apparent from the following detailed description when taken in conjunction with the accompanying drawings.

BRIEF DESCRIPTION OF THE DRAWINGS

FIG. 3A is a clock background pattern having an aquarium design according to the present invention.

FIG. 3B is a clock background pattern having a traditional hanging clock design according to the present invention.

FIG. 4A is an example of a real-time digital-style clock pattern.

FIG. 4B is an example of a real-time pointer-style clock pattern.

FIG. 5A is a digital-style TV clock provided by a digital photo frame device according to the present invention.

FIG. 5B is a pointer-style TV clock provided by a digital photo frame device according to the present invention.

DETAILED DESCRIPTION OF THE PREFERRED EMBODIMENT

A preferred embodiment of the invention will be described with reference to the accompanying drawings for illustrating the present invention.

Figure 1:
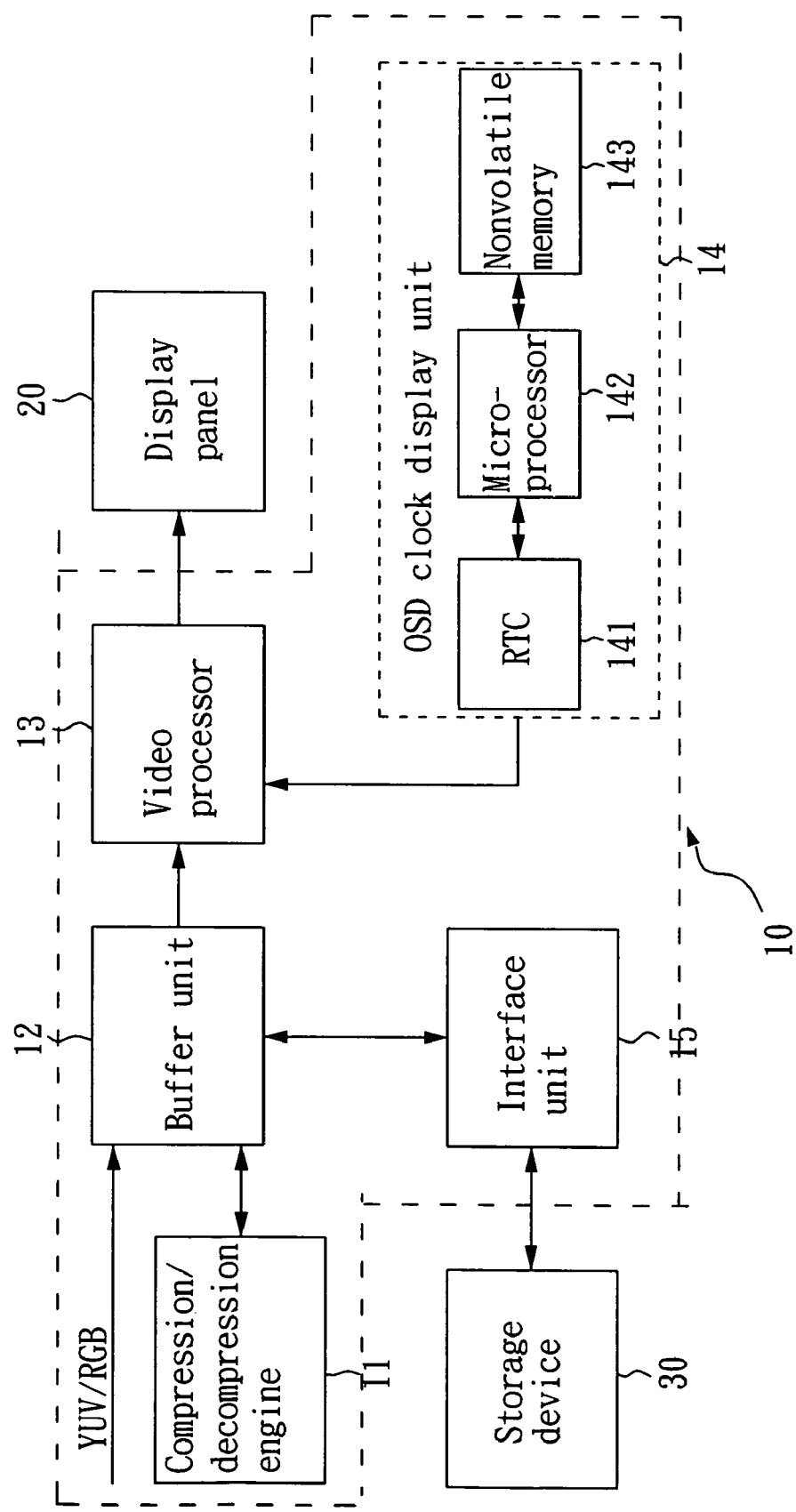
FIG. 1 shows a block diagram of a digital photo frame device according to the present invention.

FIG. 1 shows a block diagram of a digital photo frame device 10 according to the present invention, the device 10 comprising a compression/decompression engine 11, a buffer unit 12, a video processor 13, an OSD (on-screen display) clock display unit 14 and an interface unit 15. The digital photo frame device 10 is disposed on a digital TV so that the digital TV is capable of providing with photo-memo and clock-on-TV functions, in addition to playing TV program. In playing the TV programs, digital TV signals (YUV/RGB) being interlaced and temporally stored in the buffer unit 12 are de-interlaced by means of the video processor 13 for further appropriate scaling, rotation and/or position processes so as to be displayed on a display panel 20.

The buffer unit 12 is preferably a dynamic random access memory (DRAM) for temporally storing TV signals to be displayed or processed. The compression/decompression engine 11 is preferably a JPEG engine for compressing TV signals of a framed image into a JPEG file or decompressing a JPEG file into TV signals. The compression/decompression engine 11 is coupled to the buffer unit 12. When the digital TV is playing the TV programs, the compression/decompression engine 11 compresses the digital TV signals temporally stored in the buffer unit 12 into the JPEG file which is then temporally stored back to the buffer unit 12 if the user chooses to save the framed image being currently played.

The interface unit 15 is coupled to the buffer unit 12, being capable of writing data from the buffer unit 12 to an external storage device 30 or data from the external storage device 30 into in the buffer unit 12. The interface unit 15 can be a USB interface or an interface of various memory cards such as SMC, MMC/SD, MS and CF. Correspondingly, the external storage device 30 can be a PC with a USB interface or one of the memory cards (SMC, MMC/SD, MS and CF). The JPEG file temporally stored in the buffer unit 12 after compression by the compression/decompression engine 11 is stored in the memory card via the interface unit 15 or transferred to a PC via the USB so as to save important images and data. On the other hand, the JPEG file or an MPEG file (such as AVI file) stored in the memory card can be written to the buffer unit 12, having access to the buffer unit 12 after decompression by means of the compression/decompression engine 11 for further appropriate scaling, rotation and/or position processes by means of the video processor 13 so as to be displayed on the display panel 20.

Figures 2A, 2B:
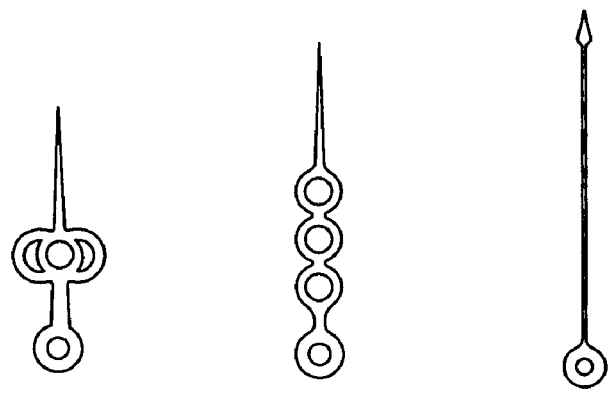
FIG. 2A is a digital-style OSD time pattern according to the present invention.
FIG. 2B is a pointer-style OSD time pattern according to the present invention.

The OSD clock display unit 14 includes a real-time clock (RTC) 141, a microprocessor 142 and a nonvolatile memory 143, wherein the real-time clock 141 records the current time while the nonvolatile memory 143 stores a digital-style or pointer-style OSD time pattern in advance. FIG. 2A shows a digital-style OSD time pattern having patterns of 0 to 9 digits and colon symbols. FIG. 2B shows a pointer-style OSD time pattern having patterns of hour hand, minute hand and second hand.

The external storage device 30 can pre-save various pictures in the JPEG file which can be written to the buffer unit 12 by means of the interface unit 15. TV signals representing the picture are temporally stored in the buffer unit 12 after decompression using the compression/decompression engine 11 for further appropriate scaling, rotation and/or position processes by means of the video processor 13 so as to be displayed on the display panel 20. Specifically, the external storage device 30 can pre-save various clock background patterns in the JPEG file, such as a clock background pattern having an aquarium design as shown in FIG. 3A and a clock background pattern having a traditional hanging clock design as shown in FIG. 3B. These clock background patterns in the JPEG file can be written to the buffer unit 12 by means of the interface unit 15, and then, TV signals are temporally stored in the buffer unit 12 after decompression by means of the compression/decompression engine 11 for further appropriate scaling, rotation and/or position processes by means of the video processor 13 so as to be displayed on the display panel 20.

The microprocessor 142 of the OSD clock display unit 14 determines the real-time clock pattern to be displayed and the position of the display according to the current time recorded by the real-time clock 141 in association with the OSD time pattern read from the nonvolatile memory 143. As shown in FIGS. 4A and 4B respectively, there are a digital-style clock pattern and pointer-style clock pattern indicating that the current time is nine thirty and twenty-one seconds. As shown in FIGS. 5A and 5B respectively, these clock patterns then overlay over the clock background patterns respectively by means of the video display in an OSD fashion to bring about a clock having digit-change function and a clock having pointer-movement function.

In view of the foregoing, it is known that the present invention enables the digital TVs having various displays such as CRT, LCD, PDP and backlight projection to have the digital photo frame (DPF) function. Hence, the household TVs is provided with multimedia functions such as photo indication, selection of static-state video photo and information, photo album and clock indication to fully utilize the digital TV advantage of image display and meet the users' demand.

Although the present invention has been explained in relation to its preferred embodiments, it is to be understood that many other possible modifications and variations can be made without departing from the spirit and scope of the invention as hereinafter claimed.

What is claimed is:

1. A digital photo frame device, comprising:
    a buffer unit for temporarily storing TV signals to be displayed or processed;
    a compression/decompression engine coupled to the buffer unit for compressing TV signals in the buffer unit into an image file or decompressing an image file into TV signals;
    a video processor for displaying the TV signals temporarily stored in the buffer unit on a display unit;
    an external storage device pre-saved with data representing various clock background patterns;
    an interface unit coupled to the buffer unit to write data from the buffer unit to the external storage device or data from the external storage device to the buffer unit; and
    an OSD clock display unit for recording the current time and storing at least an OSD time pattern in advance;
    wherein the clock background pattern pre-saved in the external storage device is written to the buffer unit by means of the interface unit so as to be displayed, and
    wherein the OSD clock display unit determines a real-time clock pattern to be displayed and a position of the display according to the recorded current time and the corresponding OSD time pattern selected when the video processor displays the clock background pattern so that the clock background pattern and the real-time clock pattern overlying over the clock background pattern are displayed on the video display in an OSD fashion.

2. The digital photo frame device of claim 1, wherein the interface unit is a USB interface.

3. The digital photo frame device of claim 1, wherein the interface unit is a memory card interface and the external storage device is a memory card.

4. The digital photo frame device of claim 1, wherein the pre-determined clock background pattern is saved in the external storage device in advance for being written to the buffer unit via the interface unit.

5. The digital photo frame device of claim 1, wherein the OSD clock display unit includes a real-time clock for recording the current time.

6. The digital photo frame device of claim 1, wherein the OSD clock display unit includes a nonvolatile memory for saving at least one set of the OSD time patterns in advance.

* * * * *